Feb. 17, 1953     R. E. GLOVER     2,628,634
FUEL FEEDING DEVICE FOR INTERNAL-COMBUSTION ENGINES
Filed Dec. 18, 1945
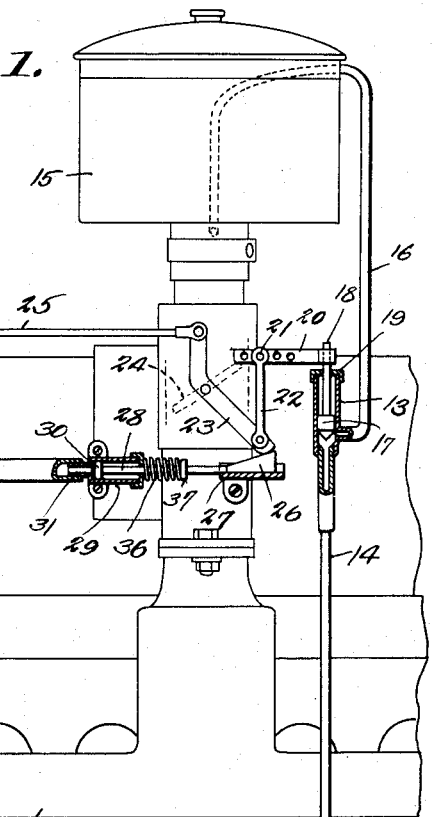
Fig. 1.
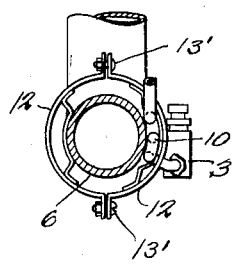
Fig. 2.
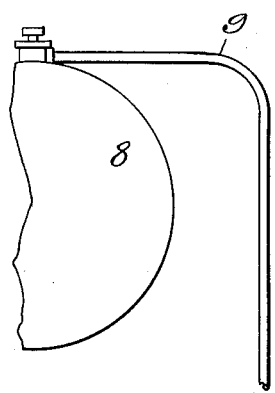
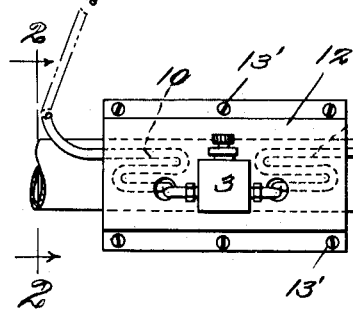
*R. E. Glover*
INVENTOR.
BY
ATTORNEYS.

Patented Feb. 17, 1953

2,628,634

UNITED STATES PATENT OFFICE 2,628,634

FUEL FEEDING DEVICE FOR INTERNAL-COMBUSTION ENGINES

Ray E. Glover, West Sacramento, Calif.

Application December 18, 1945, Serial No. 635,730

2 Claims. (Cl. 137—480)

This invention relates to an attachment for internal combustion engines, in the form of an apparatus designed for use in adding a quantity of hydrocarbon materials, such as butane or propane, to the fuel charge, increasing the efficiency of the operation of the engine, by increasing the octane content of the fuel charge.

An important object of the invention is to provide a device of this character which is in the form of an attachment which may be readily and easily positioned on an internal combustion engine, the means for controlling the hydrocarbon materials to the fuel charge, being controlled by the action of the accelerator pedal.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is an elevational view illustrating an attachment constructed in accordance with the invention, as mounted on an internal combustion engine.

Figure 2 is a sectional view taken on line 2—2, Fig. 1, illustrating the manner of supporting the coils adjacent to the exhaust manifold of the engine, to absorb heat therefrom.

Referring to the drawing in detail, the reference character 5 designates the cylinder block of an internal combustion engine, and the reference character 6 indicates the exhaust pipe leading from the exhaust manifold 7 of the engine.

The attachment forming the subject matter of the present invention, comprises a tank 8 designed for containing hydrocarbon materials which may be supported at any convenient location on a motor vehicle, the reference character 9 indicating the pipe leading from the tank 8. The pipe 9 is formed with coils 10 and 11, which coils are separated by the adjustable regulator 3, which is designed to lower the pressure of the hydrocarbon material added to the fuel charge to the desired degree, which varies from five to fifteen pounds per square inch. The coils 10 and 11 are secured adjacent to the exhaust pipe 6, by means of the bands 12 which are secured together, by means of the screws 13', affording means whereby the bands may be readily and easily clamped into position on the exhaust pipe of the engine.

Coils 10 and 11 are so supported that they contact with the exhaust pipe 6 and absorb heat therefrom, to heat the highly volatile fuel, passing through the pipe 9.

The pipe 9 is in communication with the valve housing 13 through the pipe 14, and the valve housing 13 is in communication with the air filter 15, through the pipe 16.

Operating within the valve housing 13, is a valve 17 that has its stem 18 projecting through an opening in the cap 19 of the valve housing. Connected with the valve stem 18 and extended laterally therefrom, is an arm 20 which is provided with a plurality of spaced openings, the openings being designed to receive the bolt 21 that extends through openings in the upper end of the link 22, so that the link 22 may be adjusted with respect to the arm 20, to vary the movements of the valve 17.

The lower end of the link 22 connects with the lever 23 that is pivotally connected to the intake manifold, the link being mounted on one end of the lever 23, that is pivotally mounted on the shaft of the butterfly valve 24 that controls the passage of fuel to the engine cylinders. This lever 23 and butterfly valve, are actuated by means of the rod 25 that connects with the accelerator pedal in the usual manner, and which is operated to control the passage of the fuel to the engine.

As clearly shown by Fig. 1 of the drawing, the lower end of the lever 23 is rounded, and rests on the inclined surface of the control block 26 which moves over the bracket 27 secured to the outer surface of the intake pipe of the carbureter.

Extending from one end of the control block 26, is a rod 28 that passes into the tubular housing 29, the rod 28 carrying the plunger 30 at its inner end.

Extending from one end of the tubular housing 29, is a pipe 31 to which one end of the hose 32 is connected, the opposite end of the hose being connected with the nipple 33 extending from the pipe 34 in which a vacuum is created, the pipe 34 providing a connection with the pipe 35 that leads to the vacuum-controlled windshield wiper of the usual motor vehicle. Thus it will be seen that due to this construction, when the engine is in operation, a vacuum will be created in pipe 32, drawing the plunger 30 to the position as shown by Fig. 1, whereupon the valve 17 is moved to its open position, allowing the highly volatile fuel contained in the tank 8, to pass therethrough, where it is discharged into the stream of air passing into the carbureter.

Mounted on the rod 28, at a point exteriorly of the tubular housing 29, is a coiled spring 36 one end thereof bearing against the collar 37 secured to the rod 28. The coiled spring 36 which is tensioned to move the control block 26 outwardly or away from the housing 29, overcoming the vacuum created in housing 29 under normal running conditions whereupon the lower end of the lever 23 moves to the low side of the block 26, causing the valve 17 to close preventing further passage of the highly volatile fuel through the pipe 16. As soon as the engine is set in motion as in starting under acceleration, the vacuum produced in pipe 32 will overcome the action of said sping 36 moving the control block, opening the valve 17.

From the foregoing it will be seen that due to the construction shown and described, the highly volatile fuel passes from the tank 8 into the coil 10, where it is heated. The highly volatile fuel is now in a vaporized state and passes through the condenser 3, reducing the pressure to the desired degree. As the vaporized fuel passes from the regulator, the vaporized fuel enters the coil 11, where it is further heated. The highly vaporized fuel is now drawn upwardly through pipe 14, through the valve housing 13 and pipe 16 where it enters the filtered air, passing from the air filter 15, to the carburetor.

It might be further stated that the usual gasoline fuel line of the motor vehicle may be cut off by means of a valve not shown, and which is disposed in the usual gasoline fuel line and the highly volatile fuel used, when conditions are such that it is desirable to use a highly volatile fuel such as in starting in cold weather. After the engine has been started, the gas line may then be opened to allow the fueling of the engine through the usual channels, with the addition of the highly volatile fuel, if desired.

From the foregoing it will be seen that due to the construction shown and described, the operation and utility of the invention will be clearly understood, and that a further detailed disclosure as to the use of the device is unnecessary.

What is claimed is:

1. An internal combustion engine butterfly valve operating mechanism embodying a valve operating lever connected to said butterfly valve, a manually controlled operating rod connected with the lever, means for supplying hydrocarbon materials to the internal combustion engine, including an auxiliary fuel discharge control valve, an arm connected to the auxiliary fuel charge control valve, a link connecting the arm and lever whereby movement of the lever operates the auxiliary charge control valve, a movable control block operated by suction of the engine, said block having an inclined surface over which one end of the lever moves moving the link and arm operating said valves simultaneously, and means for biasing said block away from said lever closing said auxiliary fuel controlling valve under normal engine running conditions.

2. A valve operating mechanism adapted to be connected with the butterfly valve of an internal combustion engine, embodying a valve operating lever connected to the butterfly valve, a manually controlled operating rod connected with the lever, means including a pipe and auxiliary valve controlling the passage of fuel through the pipe, for supplying hydrocarbon materials to the engine, an arm connected to the auxiliary valve, a link connecting the arm and lever whereby movement of the lever operates the auxiliary valve, a movable control block having an inclined upper surface on which one end of the lever operates moving the link and arm operating said valves simultaneously, a suction control rod connected with the control block operating said lever and valves independently of the manually controlled operating rod, and a coiled spring mounted on said suction control rod normally biasing said rod and block away from said lever, under normal running conditions of the engine cutting off the supply of hydrocarbon material to such engine.

RAY E. GLOVER.

REFERENCES CITED

The following references are of record in the file of this patent:

UNITED STATES PATENTS

| Number | Name | Date |
| --- | --- | --- |
| 1,210,533 | Renault | Jan. 2, 1917 |
| 1,218,545 | Giddens | Mar. 6, 1917 |
| 1,758,397 | Evans | May 13, 1930 |
| 2,142,979 | Hans | Jan. 3, 1939 |
| 2,361,103 | Issigonis | Oct. 24, 1944 |
| 2,381,304 | Merrill | Aug. 7, 1945 |